July 21, 1931.  A. HOGSTAD, JR  1,815,302
METHOD OF PRODUCING ALKALOIDS
Filed March 17, 1926
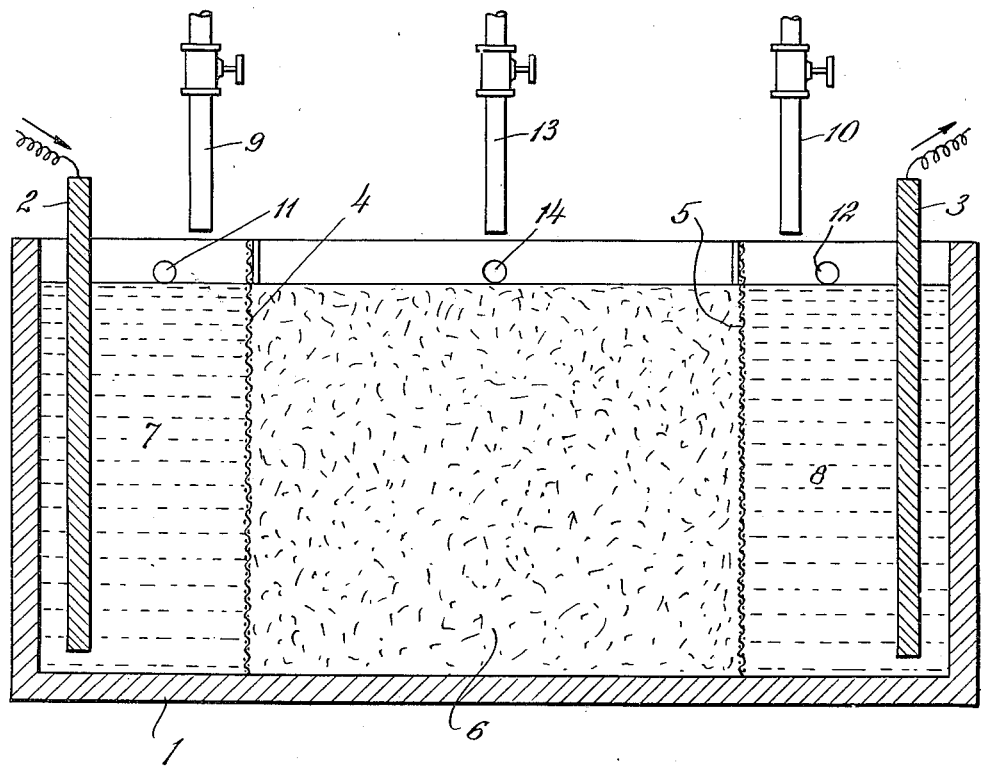
INVENTOR
Anton Hogstad Jr.
BY
ATTORNEYS Patented July 21, 1931

1,815,302

UNITED STATES PATENT OFFICE

ANTON HOGSTAD, JR., OF ST. PAUL, MINNESOTA, ASSIGNOR TO THE NORTHWEST PAPER COMPANY, OF CLOQUET, MINNESOTA, A CORPORATION OF MINNESOTA

METHOD OF PRODUCING ALKALOIDS

Application filed March 17, 1926. Serial No. 95,203.

This invention relates to the isolation of valuable constituents of vegetable materials, and to the separation and purification of plant bases. The method is applicable to the isolation, separation or purification of vegetable drugs, medicinals, organic acids, and such other valuable or desirable products as naturally migrate, or are capable of being made to migrate, under the influence of an electric current.

In its preferred embodiment, the invention is directed to the isolation, separation or purification of that group of therapeutically active agents known as alkaloids.

The underlying principles of the invention, and the details of its application to various specific problems, will become clear from the following description, taken in conjunction with the accompanying drawing.

The single figure of the drawing illustrates diagrammatically an electrolytic cell suitable for use by the method hereinafter set forth.

The apparatus comprises a box or container 1 of wood or other insulating material having an anode 2 in the form of a graphite plate, and having a cathode 3 in plate form, and made of graphite or of a metal inert to the electrolyte under the conditions of operation. Transverse partitions 4 and 5 divide the tank 1 into three compartments, a central compartment 6, an anode compartment 7, and a cathode compartment 8. For certain purposes, the diaphragms 4 and 5 may consist of simple screens, such as 10 oz. canvas. Under other circumstances they may be made of parchment, collodion, cellophane, or of earthenware. The degree of porosity or of permeability of these partitions or diaphragms will depend, of course, on the details of the isolation, separation or purification being carried out in the cell. Water or other liquid may be introduced in the anode compartment 7, either continuously or intermittently, through a supply pipe 9; and similarly, water or liquor can be introduced into the cathode compartment 8 through supply pipe 10. An overflow orifice 11 permits continuous removal of liquor from the anode chamber and a similar orifice 12 permits continuous removal of liquor from the cathode compartment 8. The central compartment can be provided with a supply pipe 13 and an outlet 14.

My present invention has many advantages over the methods commonly in use for the isolation, separation and purification of vegetable drugs, medicinals, organic acids, and the like. It makes unnecessary the use of the large volumes of solvents now commonly used. It greatly shortens the time needed for the production of finished products from the crude or original starting material. It permits the production of an extremely pure product, or of a comparatively pure product, as occasion may require.

It is an important feature and advantage of my process that products of various kinds are obtained without having been subjected to the drastic chemical and physical treatments heretofore thought necessary for their isolation and purification. I think it entirely probable that in the isolation of alkaloids by usual chemical methods those alkaloids are altered in an undesirable way by the chemical and physical steps heretofore thought necessary for their isolation. I am certain that valuable constituents of the crude or starting material are destroyed in isolating some of the alkaloids, and that other valuable materials, though not destroyed, are not removed by the present methods of separation or extraction. I am confident that by the practice of my process on alkaloid-bearing crude materials, new products can be obtained, and in some cases, old products can be obtained in a higher form of purity and free or substantially free from contaminating drugs or principles.

Although my process is particularly well adapted for the isolation of desired products from crude starting materials, such as bark, leaves, roots, flowers and seeds, that is to say, from vegetation, it is also of great use in splitting up crude extracts obtained by known methods from such vegetation, to isolate from such extracts one or many of the valued principles contained therein.

When the crude vegetation itself is used as the starting material, its preliminary preparation is dependent in a measure on the physical character of the vegetation. In general, it must be put in such physical state that water or other liquor can penetrate through the fibrous structure wherein the drugs are stored. If the bark, leaves, roots, flowers or seeds are in the green or fresh state, there is greater resistance to such penetration than after the material has been dried or cured. In any event, the starting material is so ground, bruised, dried, cured, frozen or fermented as to insure free access through its fibrous structure of any liquor in which it may be immersed.

If the starting material is in the form of a liquid extract, resulting for instance from some extraction step now known, this preliminary step of physically preparing the material for penetration by water or other liquid is, of course, unnecessary.

The starting material, whether in the form of physically sub-divided raw vegetation, or in the form of a crude extract of such vegetation, is introduced into the central compartment 6 of an electrolytic cell of the type diagrammatically illustrated in the drawing. The size of the cell, the spacing of the diaphragms 4 and 5, the relative sizes of the three compartments, and other details, must, of course, depend on the particular problem at hand. For purposes of illustration, and as typical of my procedure, the cell may be considered as having a length of 14″, a width of 6″, and a depth of 5″, with graphite electrodes in the form of plates 4″ wide and 6″ tall, the relative sizes of the three compartments being about as shown in the drawing.

A cathode of iron, copper, or other metal may be used in place of the graphite cathode, provided it is not attacked by the cations; but because of the corrosive action of anions commonly encountered, such as chlorides or sulphates, graphite, platinum, or other material highly resistant to corrosion must be used as the anode.

A source of direct current is connected across the electrodes of the cell. The voltage of that source is dependent on the electrical conductivity of the liquor in the cell and on the change to be performed in that liquor. A potential of 220 volts is suitable for some of the operations hereinafter described in detail.

Assuming for the moment that water alone is used as the liquor in which the starting material is immersed, and that the starting material is in the form of crude vegetation that has been brought to proper physical condition for intimate contact with the water, the water may fill all compartments of the cell to the level indicated in the drawing.

My understanding of the principles underlying isolation or separation of drugs, and like products, from this vegetation, when an electrical potential is impressed on the electrode and current is thereby caused to pass through the liquor is as follows:

Soluble salts, acids and alkalies, carried by the starting material, dissolve in the water, and certain colloids carried by the starting material become suspended in the water, with freedom to move about under the action of a directing force. An electrical current will flow through the liquor from the anode to the cathode, the current density being relatively small because of the low electrical conductivity of the liquor. This flow of current will electrolyze the soluble salts, soluble acids, and alkalies, delivering one radicle at the anode and the other at the cathode, according to principles now well understood. Thus, if the crude material contains a salt such as sodium chloride, this salt will go into solution to form a conducting electrolyte and on the passage of electric current the sodium will migrate to the cathode where it will react with the water forming caustic and liberating hydrogen gas, and the chlorine will migrate to the anode and there escape as chlorine gas. The partitions or diaphragms 4 and 5 cooperate with the flow of the electrical energy in preventing these freed products from diffusing back and causing chemical reactions with the crude material in compartment 6, as hereinafter explained. Canvas partitions are not always the best materials for preventing backward diffusion of separated products as hereinafter explained.

Organic compounds of the vegetation will, in like manner, dissolve in the water, and add to its electrolytic conductivity, and on the passage of the electric current will be decomposed into positive or basic fractions or radicles migrating to the cathode, and into acid or negative fractions or radicles migrating to the anode.

But in addition to this, there is another principle involved, and one of great importance in the isolation of organic materials, such as alkaloids, namely, the migration under the influence of electrical current of crystalloidal materials which do not become ionized, and do not give conductivity to the electrolyte in the manner and to the extent that salts, acids, and alkalies do.

In the case of drugs, medicinals, organic acids, or other like products, which do not form salts with acids or alkalies, these may migrate naturally or may be made to migrate by appropriate means, under the influence of electric current, due to their electric charges. Those possessing such a charge will migrate in the same manner as any crystalloidal particles. Those possessing a positive charge will migrate to cathode while those possessing a negative charge will migrate to anode.

As an instance of the process, its application to the cinchona alkaloids will be described. The bark of any suitable species of cinchona is ground to a degree sufficient to rupture the cell walls, this step being essentially the same as if the bark were to be extracted with solvents by known methods. Grinding to a 40 to 60 mesh is satisfactory. The bark so ground is placed within the central compartment 6 of the electrolytic cell and water and sulfuric acid are added until the liquor has an acid content of about one quarter of 1 per cent by weight. There is advantage in acidifying the water in the central compartment, whether the starting material consists of finely ground yellow cinchona bark from which quinine is to be extracted, or consists of other crude vegetation containing alkaloids. With cinchona bark the sulfuric acid increases the solubility of the alkaloid salts normally present in the bark by changing them into sulfates with the net result that the electrolytic conductivity of the liquor in the central compartment is very perceptibly increased.

The next step consists in passing direct current through the cell. Direct current at a pressure of 220 volts is suitable. The passage of the electric current through the liquor thus enriched with organic sulfates will cause migration of the sulfate radicle toward the anode, and corresponding migration of the alkaloidal or basic radicle toward the cathode.

With cinchona bark in a dilute sulfuric acid solution a current of 1 ampere for the size of a cell above described or about 4 amperes per square foot of cross sectional area is suitable. The greater the amount of organic salts contained in the bark, the higher will be the electrolytic conductivity of the liquor, and the greater will be the current density through the cell at any given voltage. Control of the voltage impressed on the cell may in some instances be needed to protect against overheating.

After the electric current has passed through the cell for a short time, the cathode liquor will respond to a test for quinine and the anode liquor will respond to a test for sulfate and chloride, with which may be associated certain organic radicles.

As complemental to the electrolytic separation of inorganic and of organic compounds, there will have been effected a migration to the anode compartments of such particles as normally carry negative charges in such a dilute acid solution, and there will have been effected a migration to the cathode compartment of such colloidal particles as normally carry positive electrical charges in such an acid solution. In separating colloidal particles in this manner, a diaphragm of suitable porosity to permit the passage of colloidal material must be used.

By adding fresh liquor, for instance, water, either hot or cold, to the anode and cathode compartments through pipes 9 and 10 and drawing off the liquor from those compartments either intermittently or continuously through outlets 11 and 12, back diffusion into the central compartment can in large measure be prevented. Not only may the water in the electrode compartments be removed continuously, but water or dilute acid either hot or cold may be added continuously or intermittently into the central compartment as through pipe 13, and liquor may be drawn off from that central compartment, either continuously or intermittently through outlet 14. The operation of extracting the starting material by the passage of electric current may be continued until the starting material is substantially or sufficiently exhausted of its valuable content.

I have found in my work on the extraction of quinine from cinchona bark that with a diaphragm as porous as 10 oz. canvas there is little trouble by diffusion of the alkaloids backward from the cathode chamber. The solution at the cathode can be permitted to remain in the cell until it becomes relatively concentrated with alkaloids, together with such positive or basic elements as may also have migrated to it from the plant substance. There is then added to the cathode liquor, either while in the cathode chamber or after removal therefrom, enough alkali to throw all alkaloidal substances out of solution. Some of the materials thus thrown out of solution will be in suspension and some will be in the form of a concentrated precipitate. Also to the alkaloid cathode liquor either while in the cathode or after removal therefrom I add an organic solvent, such as chloroform, ether, or petroleum benzine. The mixture is then agitated and the solvent bearing the alkaloids in solution is decanted off or otherwise physically separated from the water.

In another aspect, the electrical extraction above explained is a notable advance over methods now commonly employed for the extraction, separation and purification of alkaloids, for it furnishes a means by which individual members of an alkaloidal group may be separated from one another. The cinchona group contains not only quinine, but also cinchonine, cinchonidine and quinidine, and alkaloids of less importance. Quinine has great commercial utility and is the alkaloid of this group usually sought for, but quinidine has recently come into use as a specific remedy for auricullar fibrillation. When cinchona bark is extracted with dilute acid by usual methods, there is separated from it not only quinine, but also cinchonine, cinchonidine and quinidine. The subsequent steps of separating these drugs one from another involve troublesome fractional crystallization with heavy loss of valuable components.

By my electrical method, on the contrary, a separation can be effected, to a very appreciable extent at least, by suitable control of the current density in the cell and by the acidity of the liquor in the central compartment. Quinine, in a dilute sulfuric acid solution, possibly carries a higher positive charge than these other alkaloids, and consequently would tend to separate more easily than the others. By starting the extraction with low current density and suitable acidity, the quinine can in large part be separated before the other alkaloids commence to separate out.

After the quinine has been, in large measure, extracted from the bark, the voltage on the cell, or the current passed through it, together with the hydrogen ion concentration, can be adjusted to separate out that alkaloid of the series which more nearly resembles quinine in the magnitude of its positive charge. The same can be applied to other alkaloids of the series.

As the hydrogen ion concentration is varied for different lots of cinchona bark, different yields will be obtained. That concentration which will result in the optimum yield should be previously determined for any given lot of bark. At one concentration all of the members of the group may migrate to the cathode. At other concentrations, the individual members will concentrate in other proportions. Accordingly, if it is desired to obtain quinine to the exclusion of other members, the hydrogen ion concentration will be so adjusted as to permit maximum migration of quinine, but minimum migration of the other alkaloids. If quinidine is desired, the hydrogen ion concentration will be adjusted to give maximum yield of this substance. By so varying the hydrogen ion concentration and varying the current applied, the liquor at the cathode will be found to contain desired yields of specific alkaloids of the group, and these may be extracted and purified in usual manner by precipitation with alkali followed by shaking out with chloroform or other suitable organic solvents, and subsequent evaporation of the solvent to crystallize the alkaloids or mixture of alkaloids.

The chloroform or other solvent can be recovered by condensation in usual manner. Such inorganic compounds as may have been precipitated in the cathode liquor, or such as may remain in solution in the liquor, are not taken up by the chloroform, but remain in the residual liquor.

With some starting materials, such as cinchona bark, a drug of great purity can be obtained by this simple operation of dissolving in chloroform and then recovering from the solvent. With other starting materials, and with other drugs, more elaborate steps of separation and purification are needed. But under any circumstance the selective action of the electric current under suitable control of the acid condition in the central compartment, greatly facilitates all of the subsequent steps.

As a modification of the procedure above described, it is possible and advantageous under some circumstances to introduce into the cathode compartment through pipe 10, not only water or dilute acid, but a solvent such as chloroform, thereby consolidating the operations. In using chloroform in this way due regard must be had to the maintenance of suitable electrical conductivity in the cathode compartment, either by continuous or intermittent agitation of the contents of the cathode compartment, followed by decanting or by the use of the chloroform in relatively small bulk. Under some circumstances chloroform can be replaced by a solvent of better electrical conductivity, or one having greater solvent power.

As above intimated, the starting material need not be cinchona bark itself, but may be a crude extract of that bark, so that the contents of the central compartment will not include any fibrous material but will consist solely of an extract with a suitable amount of water or acidified water.

There is thus at hand a ready means for separating one alkaloid of a series from others of that series at the time of their extraction from the starting material or crude vegetation;—an advantage of great importance in the production of certain drugs.

Another method for differential extraction and purification may be accomplished by the use of screens of different degrees of permeability. In such case, a screen, such as a filter or membrane, is employed that will permit the passage of an alkaloid to be extracted while preventing passage of the others, or vice versa. The residue containing the mixture of other members of the group may then be placed in another cell and by use of a screen of a different degree of permeability a second differential extraction may be had, and by like processes or by repetitions of this process and the use of screens of differing permeability, complete separation of specific colloids may be effected. In this case, the extracted produce is likewise purified in the manner above described.

For the purpose of stating more in detail the proper conditions surrounding the extraction of quinine from cinchona bark, the following illustrative example is given:

25 grams of powdered yellow cinchona bark of 40 to 60 mesh was mixed with 300 cc. of 0.25% sulfuric acid, and this then added to 1700 cc. of 0.25% sulfuric acid in the middle compartment at room temperature. One liter of distilled water was placed in each of the electrode chambers. A current of 220 volts and .8 amperes was then applied and was allowed to flow for a period of an hour. The liquor drawn off from the cathode chamber after the first five minutes of operation when treated with a few drops of dilute sulfuric acid produced a slight turbidity with Mayer's reagent, thus indicating the presence of alkaloids. The turbidity markedly increased as electro-dialysis was continued, producing heavy precipitation after fifteen or twenty minutes of operation. Throughout this period of one hour the temperature of the cathode chamber increased gradually from 25° C. to 94° C., and the amperage from .8 to 5. Portions of the liquor from the cathode chamber were treated with ammonia water to insure complete removal from solution of the bases contained therein, either by converting them into a precipitate or into a colloidal suspension. The liquor was then shaken out with a series of 25 cc. portions of chloroform and separation effected in the usual manner. The chloroform containing the dissolved alkaloid or alkaloids was then evaporated to dryness and quinine obtained therefrom in the form of a white crystalline mass of silky needles. The quinine responded to the thalleioquin test and gave a blue fluorescence in sulfuric acid solution, etc. Similar separation and purification is applicable to other groups of alkaloids, and to the individual alkaloid of each group, namely:

1. The opium group of alkaloids some thirty in number, including morphine, codeine, narceine, papavarine, narcotine, etc. may be obtained.

2. Nicotine can be extracted from tobacco for the preparation of insecticides, or other purposes, and for the production of nicotine-free tobacco useful in the manufacture of cigars and cigarettes.

3. Applied to the nux vomica group the method may be applied to the extraction and differential separation of strychnine and brucine.

4. Applied to the solanaceæ, the process may be used for the extraction and differential separation of atropine, hyoscine, hyoscyamine, daturine, solanine, etc., from belladonna, hyoscyamus, stramonium, etc., and affords an instrument for investigations into the exact constitution of the drugs of this group.

5. The process can be applied to purine bases whether those be regarded as alkaloid bases or not, as for the production of decaffeinated coffee and de-theobrominized cocoa, and the production of caffeine theophylline and theobromine.

6. Applied to the physostigma the process is particularly suited to differential separation of physostigmine and calabarine. It appears that these two drugs are physiologically antagonistic and a method for their exact separation has heretofore been badly needed.

7. In the ipecac group, emetine and cepheline can be separated.

8. In the granatum group, pelletierine, a mixture of four alkaloids can be produced.

9. Aconitine can be produced from aconite.

10. In the ergot group, ergotoxine and ergotonine may be isolated and separated.

11. Berberine can be obtained from berberis and hydrastis can be made to yield berberine and hydrastine.

12. Coca leaves can be made to yield cocaine.

13. Gelsemium can be made to yield the slightly active alkaloid gelsemine, and this can be separated from the highly toxic gelseminine.

14. Sabadilla can be made to yield veratrine.

15. Philocarpus can be made to yield pilocarpine.

16. Sanguniaria can be made to yield the alkaloid sanguinarine.

17. The alkaloids sparteine can be extracted from broom tops.

Other illustrations might be given, but the foregoing will show the comprehensive scope of the process here under discussion.

In addition to the extraction of alkaloids from the crude plant substance, the process is applicable to the purification of crude or of commercial extracts of products. The process is even applicable to a pure mixture of two drugs where it is desirable to split the mixture to separate one drug from another, this being a point of great physiological utility as applied to the antagonistic alkaloids of the physostigma group. Physostigmine and calabarine are physiologically incompatible and unless a pure alkaloid is obtained, the presence of the antagonistic member as an impurity results in a product of uncertain action.

Under some conditions the temperature of the liquor in the central compartment is of importance. In general, the heating of the contents of the cell results in a more rapid extraction of the desired products. Under some circumstances the converse is true. Heating cannot always be resorted to because with some alkaloids the application of heat produces undesirable effects in the materials. Automatic temperature control equipment of usual type can be used, and when desired, the contents of any of the compartments may be agitated in known manner either continuously or intermittently.

If under some circumstances an alkaline condition in the central compartment is essential to extraction of the desired drug or product, the chemical and electrochemical phenomena involved are essentially the same as for an acid condition in the central compartment. The same is true for a neutral condition in the central compartment.

With some crude materials, or in other words, for the extraction of certain drugs, the canvas partitions 4 and 5 can best be replaced by less porous material. By using in their place permeable or semi-permeable membranes of collodion, cellophane, or parchments, either animal or vegetable, or clay filters, the diaphragms may be of assistance in holding back in the central compartment components of the starting material which are undesirable products. Thus the membrane can be of assistance in permitting the passage of drugs, medicinals, organic acids, or other valuable and desirable products, while at the same time retaining or holding back not only the fibrous structure of the starting material, but also colloids and other components which partake of the nature of impurities if permitted to pass through and become a part of the electrode liquors.

Under some circumstances, as where the starting material has a relatively heavy electrical charge, one of the diaphragms or partitions can be omitted entirely. Under these circumstances the separating effect of the electrical current will produce all of the physical separation needed to successful operation.

As an intermediate course, there may be used one canvas membrane or screen, and one permeable or semi-permeable membrane, the canvas being relied upon purely for physical retention of material and the membrane having other functions in addition.

The foregoing description will make clear the underlying principles of my process as applied to the extraction, isolation and purification of alkaloids, whether the starting material is crude vegetation or a crude extract or a pure extract containing more than one alkaloid, without attempting to trace out all permissible variations in the technique. A great variety of valuable or desirable products can be produced, particularly alkaloids which have the chemical capacity of naturally migrating, or which are capable of being made to migrate under the influence of an electric current when suitable control is had over the hydrogen ion concentration of the liquor or solvent with which the starting material is in intimate contact.

I claim:

1. The method of extracting alkaloids from suitable starting material, and simultaneously partially separating the alkaloids from one another, which comprises passing an electric current through an aqueous suspension of the starting material, and correlating the current density in the liquor and the hydrogen ion concentration of the liquor.

2. The method of extracting alkaloids from their vegetable fiber base which comprises confining the fiber base between suitable diaphragms of an electrolytic cell wherein the fiber base is in intimate contact with an electrolyte of suitable hydrogen ion concentration, passing an electric current through said cell, and removing the alkaloids accumulated at the cathode thereof.

3. The method of extracting quinine from cinchona bark and separating the quinine, to some extent at least, from other alkaloids of its group, which comprises passing an electric current through an aqueous suspension of the bark while confining the bark behind a suitable diaphragm and while coordinating the hydrogen ion concentration of the liquor to effect differential migration of the several alkaloids toward the cathode.

In testimony whereof I affix my signature.

ANTON HOGSTAD, JR.